United States Patent
Wackerly et al.

(10) Patent No.: US 10,530,681 B2
(45) Date of Patent: Jan. 7, 2020

(54) IMPLEMENTING FORWARDING BEHAVIOR BASED ON COMMUNICATION ACTIVITY BETWEEN A CONTROLLER AND A NETWORK DEVICE

(71) Applicant: Hewlett Packard Enterprise Development LP, Houston, TX (US)

(72) Inventors: Shaun Wackerly, Roseville, CA (US); Charles F. Clark, Roseville, CA (US); Duane Edward Mentze, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 136 days.

(21) Appl. No.: 15/752,377

(22) PCT Filed: Aug. 14, 2015

(86) PCT No.: PCT/US2015/045283
§ 371 (c)(1),
(2) Date: Feb. 13, 2018

(87) PCT Pub. No.: WO2017/030531
PCT Pub. Date: Feb. 23, 2017

(65) Prior Publication Data
US 2019/0007303 A1    Jan. 3, 2019

(51) Int. Cl.
*H04L 12/703* (2013.01)
*H04L 12/725* (2013.01)
(Continued)

(52) U.S. Cl.
CPC ........... *H04L 45/28* (2013.01); *H04L 41/20* (2013.01); *H04L 43/028* (2013.01); *H04L 45/22* (2013.01);
(Continued)

(58) Field of Classification Search
None
See application file for complete search history.

(56) References Cited

U.S. PATENT DOCUMENTS

2011/0261831 A1   10/2011   Sharma et al.
2012/0044813 A1   2/2012    Nandagopal et al.
(Continued)

FOREIGN PATENT DOCUMENTS

| KR | 10-2015-0034627 A | 4/2015 |
| KR | 10-2015-0056159 A | 5/2015 |
| WO | WO-2014/131429 A1 | 9/2014 |

OTHER PUBLICATIONS

OpenFlow Switch Specification Version 1.4.0 (Wire Protocol 0x05) Aug. 5, 2013 (Year: 2013).*

(Continued)

*Primary Examiner* — Alex Skripnikov
(74) *Attorney, Agent, or Firm* — Hewlett Packard Enterprise Patent Department

(57) ABSTRACT

In an example, a method is disclosed for implementing forwarding behavior based on communication activity between an SDN controller and a network device. The method includes generating, for the network device, a first flow table rule to implement first forwarding behavior for a network flow if communication to the SDN controller is active. The first flow table rule comprises match criteria for matching to the network flow, a first timeout value, and a first priority value. The method also includes generating, for the network device, a second flow table rule to implement second forwarding behavior for the network flow if communication to the SDN controller is not active. The second flow table rule comprises match criteria for matching to the network flow, a second timeout value, and a second priority value. The method further includes instructing the network device to implement the first and second flow table rules.

17 Claims, 3 Drawing Sheets

(51) Int. Cl.
    *H04L 12/721*     (2013.01)
    *H04L 12/715*     (2013.01)
    *H04L 12/707*     (2013.01)
    *H04L 12/24*     (2006.01)
    *H04L 12/26*     (2006.01)
    *H04L 12/813*     (2013.01)

(52) U.S. Cl.
    CPC .............. *H04L 45/30* (2013.01); *H04L 45/38* (2013.01); *H04L 45/64* (2013.01); *H04L 47/20* (2013.01)

(56) References Cited

U.S. PATENT DOCUMENTS

| | | |
|---|---|---|
| 2013/0215739 A1 | 8/2013 | Zhang |
| 2013/0318243 A1* | 11/2013 | Chinthalapati ......... H04L 45/24 709/226 |
| 2013/0329548 A1 | 12/2013 | Nakil et al. |
| 2015/0350056 A1* | 12/2015 | He ......................... H04L 45/02 370/392 |
| 2017/0070424 A1* | 3/2017 | Xiao .................. H04L 12/6418 |

OTHER PUBLICATIONS

Casado, M et al, "Abstractions for Software-defined Networks", Oct. 9, 2014, 8 Pgs.

Guha, A. et al, "Machine-verified Network Controllers", Jun. 16-19, 2013, 12 Pgs.

International Searching Authority, The International Search Report and the Written Opinion, dated Jun. 17, 2016, PCT/US2015/045283, 12 Pgs.

Jin, X et al, "Dynamic Scheduling of Network Updates" Aug. 17-22, 2014, 12 Pgs.

\* cited by examiner

IMPLEMENTING FORWARDING BEHAVIOR BASED ON COMMUNICATION ACTIVITY BETWEEN A CONTROLLER AND A NETWORK DEVICE

BACKGROUND

Networks can include a plurality of resources connected by communication links, and can be used to connect people, provide services (e.g., internally and/or externally via the Internet and/or intranet), and/or organize information, among other activities associated with an entity. An example network can include a software-defined network (SDN).

BRIEF DESCRIPTION OF DRAWINGS

The following detailed description refers to the drawings, wherein.

DETAILED DESCRIPTION

Figure 1A:
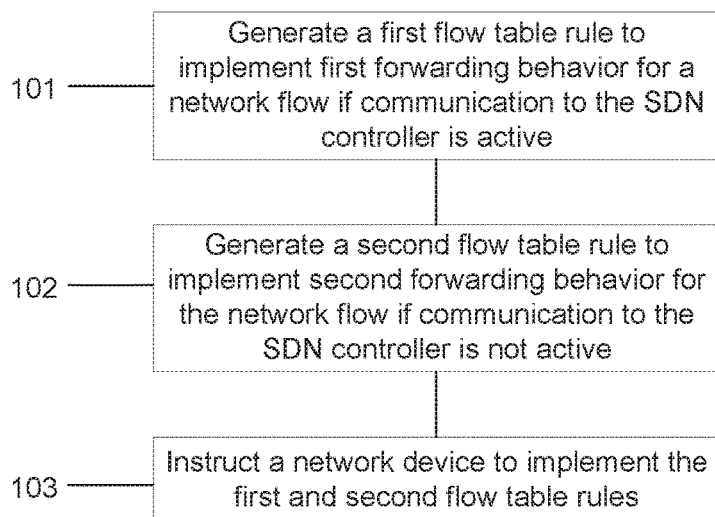
FIG. 1a illustrates a method to implement forwarding behavior based on communication activity between a controller and a network device, according to an example.

In an environment where a controlled device communicates with a controller over a communication link, such as in a software-defined network (SDN), there exists the possibility for communication with the controller to be disrupted. For example, an SDN controller could fail or the communication link between the SDN controller and a network device (i.e., the controlled device) could fail. While the network is unable to communicate with the SDN controller, the network device is not able to receive new instructions from the SDN controller, such as to change forwarding behavior of the network device. As a result, the network device may simply continue executing the instructions previously provided by the SDN controller. This may result in undesired forwarding behavior by the network device.

In an example according to the techniques described herein, a method is provided to implement forwarding behavior based on communication activity between an SDN controller and a network device. The method can be performed by an SDN controller. The controller generates, for an SDN-enabled network device, a first flow table rule to implement first forwarding behavior for a network flow in the event that communication to the SDN controller is active. The first flow table rule comprises match criteria for matching to the network flow, a first timeout value, and a first priority value. The SDN controller also generates, for the network device, a second flow table rule to implement second forwarding behavior for the network flow in the event that communication to the SDN controller is not active. The second flow table rule comprises match criteria for matching to the network flow, a second timeout value, and a second priority value. The second timeout value can be longer than the first timeout value and the second priority value can be lower than the first priority value. The SDN controller then instructs the network device to implement the first and second flow table rules.

In response to the instruction, the network device can implement the first and second flow table rules (e.g., by adding flow table entries corresponding to the rules to its flow tables). Because the first priority value is higher than the second priority value, a network flow that meets the match criteria will be matched to the first flow table rule instead of to the second flow table rule, and the network device will implement the first forwarding behavior. However, because the first timeout value is shorter than the second timeout value, the first flow table rule will expire before the second flow table rule. As a result, if communication with the SDN controller is disrupted for longer than the first timeout value, this will prevent the SDN controller from refreshing the first flow table rule, leading to expiration of the first flow table rule. In such a case, a network flow that meets the match criteria will then be matched to the second flow table rule, and the network device will implement the second forwarding behavior. Accordingly, the network device has been effectively programmed to exhibit a first forwarding behavior for the network flow when communication with the SDN controller is active and a second forwarding behavior for the network flow when communication with the SDN controller is inactive. The SDN controller is thus able to influence the forwarding behavior of the network device even in the event of communication disruption. Additional examples, advantages, features, modifications and the like are described below with reference to the drawings.

Figure 1B:
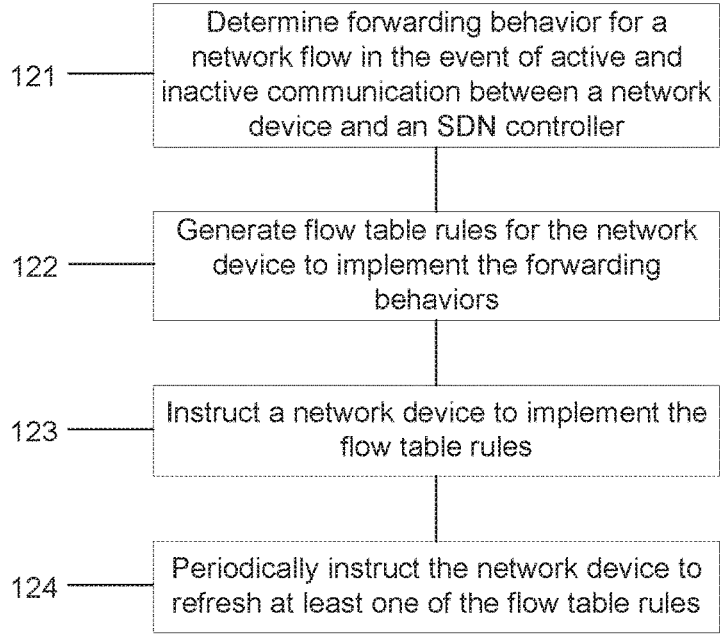
FIG. 1b illustrates another method to implement forwarding behavior based on communication activity between a controller and a network device, according to an example.

FIGS. 1a and 1b illustrate methods to implement forwarding behavior based on communication activity between an SDN controller and a network device, according to examples. Methods 100 and 120 may be performed by a computing device, system, or computer, such as SDN Controller 210 or computer 310. Computer-readable instructions for implementing methods 100 and 120 may be stored on a computer readable storage medium. These instructions as stored on the medium are referred to herein as "modules" and may be executed by a computer.

Figure 2:
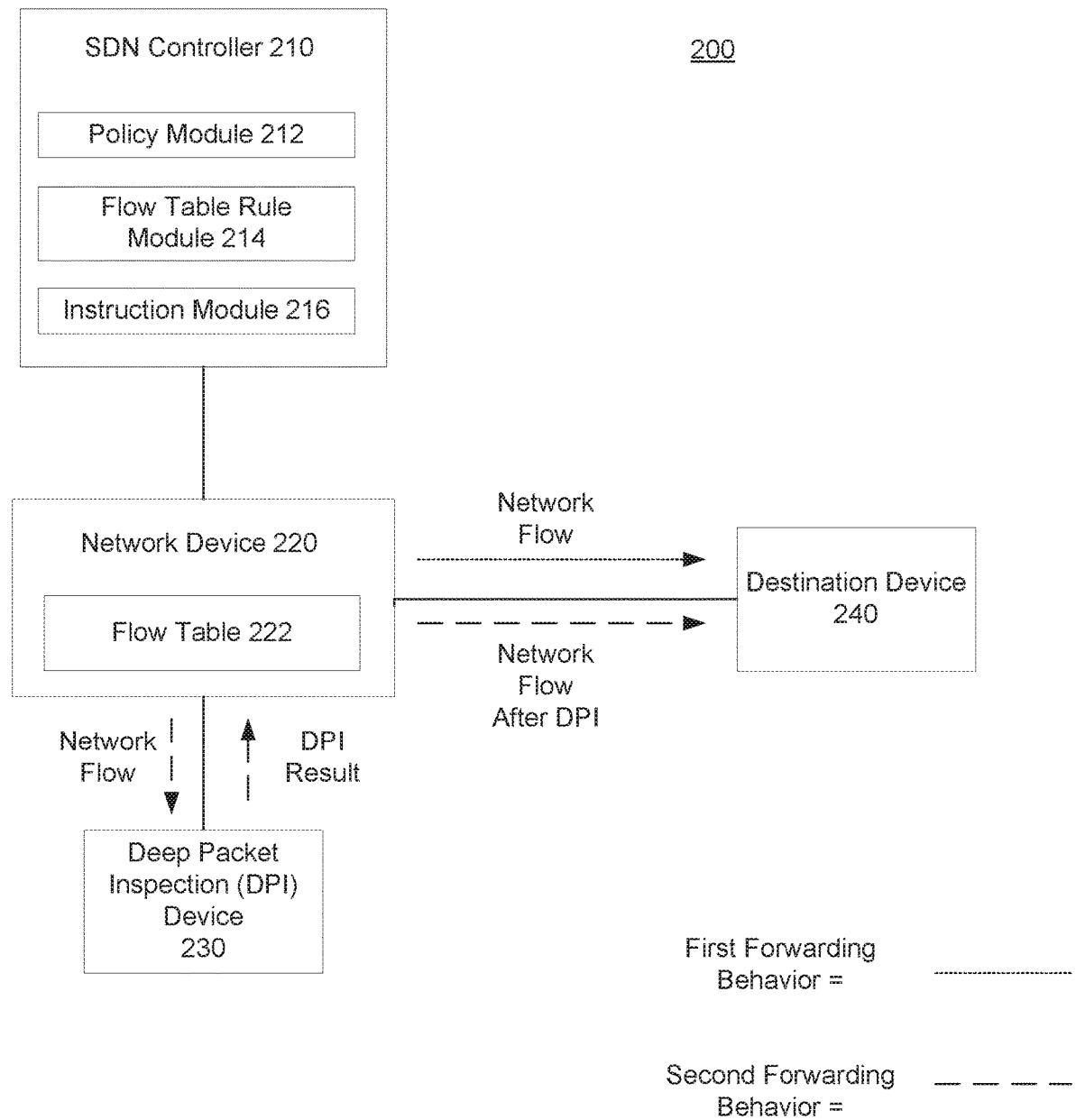
FIG. 2 illustrates a software defined network controller to implement forwarding behavior based on communication activity between the controller and a network device, according to an example.

Methods 100 and 120 will be described here relative to environment 200 of FIG. 2. Environment 200 may include and/or be implemented by one or more computers. For example, the computers may be server computers, network devices such as switches, workstation computers, desktop computers, laptops, mobile devices, or the like. The computers may include one or more controllers and one or more machine-readable storage media.

A controller may include a processor and a memory for implementing machine readable instructions. The processor may include at least one central processing unit (CPU), at least one semiconductor-based microprocessor, at least one digital signal processor (DSP) such as a digital image processing unit, other hardware devices or processing elements suitable to retrieve and execute instructions stored in memory, or combinations thereof. The processor can include single or multiple cores on a chip, multiple cores across multiple chips, multiple cores across multiple devices, or combinations thereof. The processor may fetch, decode, and execute instructions from memory to perform various functions. As an alternative or in addition to retrieving and executing instructions, the processor may include at least one integrated circuit (IC), other control logic, other electronic circuits, or combinations thereof that include a number of electronic components for performing various tasks or functions.

The controller may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory.

Environment 200 may include a number of components. For example, environment 200 may include an SDN Controller 210, a network device 220, a deep packet inspection (DPI) device 230, and a destination device 240. There may be multiple of each of these devices.

Environment 200 may be interconnected by a network fabric. The network fabric may be part of a Software Defined Network (SDN) controlled by one or more network controllers, such as SDN Controller 210. The network fabric may include wired and wireless network devices, such as switches, routers, bridges, wireless access points, and the like. An SDN network separates the control plane from the data plane, such that a network controller (e.g., SDN Controller(s) 210) can make decisions regarding where and how network traffic is to be sent while the data plane (e.g., network device(s) 220) can be programmed by the network controller to forward and manipulate the traffic. There is also an application plane including one or more SDN applications whose functionality can be implemented by the network controller. In some examples, the SDN application may be implemented on one or more computers separate from the network controller. These one or more computers may host the SDN application and interface with the network controller. Either scenario is intended to be covered when referring to a network controller, such as SDN Controller 210.

SDN controller 210 includes a policy module 212 to determine desired forwarding behavior for network device 220, a flow table rule module 214 to generate flow table rules to implement the forwarding behavior, and an instruction module 216 to instruct network device 220 to implement the forwarding behavior. Network device 220 may be a device for forwarding network traffic (e.g., packets) through the network fabric, such as a switch. Network device 220 may include a flow table 222 that stores flow table rules that instruct the network device how to forward network traffic. DPI device 230 may be a device for packet filtering to find, identify, classify, reroute, or block network packets with specific attributes in the data or code payload of the packet. DPI can identify certain packet attributes that traditional packet inspection, which focuses on packet headers, cannot detect. Destination device 240 may be the device which is the ultimate desired destination of a particular packet.

SDN Controller 210 may have other functionality for managing the network fabric (including network device 220) in accordance with the SDN paradigm. An example communications protocol for implementing an SDN network is OpenFlow. Examples in this disclosure are explained with reference to an OpenFlow implementation of an SDN network. As will be appreciated by one of ordinary skill in the art, the described examples may be implemented using other SDN communications protocols.

According to an OpenFlow implementation, switches in the network fabric store one or more flow tables for matching and forwarding network traffic received by the switch. The traffic is in the form of packets. Multiple packets directed from one device to another device may constitute a network flow. For example, packets related to a video stream, an audio stream, a web session, a Voice-Over-Internet-Protocol session, etc. between a source and a destination may each constitute a separate network flow.

The flow tables may include multiple flow table entries including various fields and corresponding information. A switch may consult the flow tables to determine how to handle a particular network flow it is receiving. A flow table entry may include match fields, timeout values, priority values, and instructions, as well as other fields not discussed here. The match fields are used to determine whether a received packet (of a network flow) matches the flow table entry. For example, as used here, the match fields include the destination node (i.e., destination device 240) for the packet. The timeout value dictates when the flow table entry will expire unless it is refreshed before the timeout value is reached. The priority value indicates the priority of the flow table entry, such that if there are two flow table entries both matching the same flow (e.g., both having the same destination field), then the switch knows to implement the flow table entry with the higher priority value. The instructions may be instructions to modify an action set or pipeline processing for the packet. In brief, the action set is the set of actions that will be applied to the packet, such as modifying a destination address of the packet, adding an intermediate destination (e.g., DPI device 230), or adding a flag to the packet. The pipeline processing refers to further processing through other flow tables stored in the switch. The flow table entry may have other fields and information, consistent with OpenFlow.

Flow table entries in a switch can be created or modified using flow table modification messages (sometimes referred to as "flowmods"). The flow table modification messages may be sent to the switch from the SDN Controller 210, thus enabling the SDN Controller 210 to handle network traffic in particular ways. Upon receiving a flow table modification message, a network device (e.g., network device 220) updates its flow table(s) to include a corresponding flow table entry. In some cases a new flow table entry is created based on the flowmod. In other cases, an existing flow table entry is modified based on the flowmod.

Method 100 may be used to implement forwarding behavior based on communication activity between a controller and a network device, according to an example. In particular, method 100 may be executed by SDN Controller 210 to implement desired forwarding behavior in network device 220 based on communication activity between SDN Controller 210 and network device 220.

Method 100 may begin at 101, where a first flow table rule is generated. The first flow table rule is to implement first forwarding behavior for a network flow in the case where communication to the SDN Controller 210 is active. The first flow table rule can comprise match criteria for matching to the network flow, a first timeout value, and a first priority value. At 102, a second flow table rule is generated. The second flow table rule is to implement second forwarding behavior for a network flow in the case where communication to the SDN Controller 210 is not active. The first and second flow table rules may be generated by flow table rule module 214. At 103, network device 220 is instructed by SDN Controller 210 (e.g., via instruction module 216) to implement the first and second flow table rules. In response, network device 220 can generate flow table entries in its flow table 222 to implement the first and second forwarding behaviors according to the communication status (active or not active) between network device 220 and SDN Controller 210.

The first forwarding behavior and second forwarding behavior are different behaviors, and can be determined by a policy module 212, as will be described in more detail with respect to FIG. 1b. Specifically, the second forwarding behavior can be a behavior that the SDN Controller 210 wants network device 220 to implement when the SDN Controller 210 is unavailable to update the forwarding behavior of network device 220. Thus, for example, the second forwarding behavior can be a behavior that is deemed to be appropriate in the case where the SDN Controller 210 is not monitoring network conditions, characteristics of the particular network flow, or the like, and is not dynamically updating the forwarding behavior of network device 220.

The first priority value can be higher than the second priority value, such that the first flow table rule takes precedence over the second flow table rule where a network flow is matched to both entries (i.e., since both rules have the same matching criteria). This causes network device 220 to use the first flow table rule to determine how to forward matching network flows instead of the second flow table rule. Additionally, the first timeout value can be shorter than the second timeout value. SDN Controller 210 (e.g., via instruction module 216) can then periodically refresh the first flow table rule at an interval shorter than the first timeout value to keep the first flow table rule active. Accordingly, in the event that communication between the SDN Controller 210 and network device 220 is interrupted (e.g., due to a disruption in the communication channel between the devices or due to a failure of the SDN Controller 210), the first flow table rule will not be refreshed and thus will expire after expiration of the timeout value. As a result, the second flow table rule will be remaining and will be used to by network device 220 to determine forwarding behavior for matching network flows.

In another example, the network device 220 could be instructed by the SDN Controller 210 to monitor for one or more control or data plane network events and change forwarding behaviors if a certain event occurs. For example, the network device 220 could monitor the connection between it and the SDN Controller 210 and, if the connection is unavailable (e.g., due to the SDN Controller 210 failing or due to network issues) for a time period equal to the timeout value, to remove the flow entry corresponding to the first flow table rule, thus allowing the second flow table rule to be used for the network flow. As another example, the SDN Controller could instruct the network device 220 to monitor a data plane link being used for a particular flow (e.g., corresponding to the first flow table rule) and, if the data plane link goes down, to remove the first flow table rule so that the second flow table rule could be used, which could cause network device 220 to forward the network flow over a different data plane link. Other examples of network events to monitor and forwarding behaviors to implement are within the scope of this application, as well.

Accordingly, using method 100 SDN Controller is able to influence the forwarding behavior of network device 220 even in the event that SDN Controller 220 is unable to actively communicate with network device 220, as the lack of communication serves as a trigger for network device 220 to begin implementing the second forwarding behavior (since the first flow table rule will removed after expiration of the first timeout value). In some examples, multiple layers or tiers of flow table rules specifying different forwarding behaviors for the same network flow may be programmed in network device 220. For instance, SDN Controller 210 can determine a series of forwarding behaviors it would like network device 220 to exhibit the longer that communication with the SDN Controller 210 is interrupted/non-active. The SDN Controller 210 can set the priority values and timeout values of each rule such that only one rule is active at any one time, and with the expiration of each rule as the communication with SDN Controller continues to be disrupted, the next rule in line will become the highest priority rule. As an example, a first rule can have priority 1 (highest priority) and a timeout value of 30 seconds, a second rule can have priority 2 and timeout value of 1 minute, a third rule can have priority 3 and a timeout value of 5 minutes, and a fourth rule can have priority 4 (lowest priority) and a timeout value of "infinite" (so that it never expires). The network device 220 will cycle from the first rule, to the second rule, to the third rule, and finally to the fourth rule as the communication with the SDN Controller 210 continues (thus causing each timeout value to expire until the infinite timeout value). Finally, different sets of forwarding behavior may be programmed in this fashion for any number of network flows, such that each network flow has its own set of matching flow table rules. This allows for SDN Controller 210 to specify forwarding behavior on a per-flow basis in the event of a communication disruption instead of simply specifying a single forwarding behavior to apply to all flows in such a case.

FIG. 1b illustrates a method to implement forwarding behavior based on communication activity between a controller and a network device, according to an example. In particular, method 120 may be executed by SDN Controller 210 to implement desired forwarding behavior in network device 220 based on communication activity between SDN Controller 210 and network device 220. The description of method 120 should be read in light of the description of method 100, in which example methods/techniques of performing various actions were described.

Method 120 may begin at 121, where SDN Controller 210 (e.g., via policy module 212) determines forwarding behavior for a network flow. Specifically, the SDN Controller 210 can determine desired forwarding behavior it would like network device 220 to exhibit when it receives the network flow. Multiple types of forwarding behavior can be determined. For example, SDN Controller 210 can determine a first forwarding behavior it would like applied to the network flow in the event that communication between SDN Controller 210 and network device 220 is active. Furthermore, SDN Controller 210 can determine a second forwarding behavior it would like applied to the network flow in the event that communication between SDN Controller 210 and network device 220 is not active (e.g., is disrupted). The forwarding behavior may be determined using the policy engine 212 to implement a desired network policy for the network flow. At 122, SDN Controller 210 (e.g., via flow table rule module 214) may generate flow table rules for the network device 220 to implement the forwarding behaviors. At 123, SDN Controller 210 (e.g., via instruction module 216) may instruct network device 220 to implement the generated flow table rules. At 124, SDN Controller 210 (e.g., via instruction module 216) may periodically instruct the network device 220 to refresh at least one of the flow table rules.

For example, it may be that during normal operation, SDN Controller 210 is actively monitoring network conditions and characteristics of the particular network flow (e.g., number of packets received corresponding to the network flow, rate of reception of packets corresponding to the network flow), for the purpose of taking dynamic action if conditions change. For instance, if characteristics of the network flow change, SDN Controller 210 may choose to throttle or block the network flow or send packets corresponding to the network flow to a Deep Packet Inspection (DPI) device 230 for further analysis. SDN Controller 210 could dynamically implement this change by pushing a new flow table rule to network device 220 to implement the new forwarding behavior. However, if communication to SDN Controller 210 is not active, then SDN Controller 210 cannot push such a rule to network device 220. Accordingly, policy engine 212 may determine that such a behavior should be set up as a second forwarding behavior (as described herein) to take effect after communication with the SDN Controller 210 is interrupted for a given time period. An example of this is shown in FIG. 2. The first forwarding behavior for a given network flow (implemented as a first flow table rule) is shown with a solid black line, in which the network device 220 forwards the network flow to destination device 240. The second forwarding behavior for the given network flow (implemented as a second flow table rule) is shown with a dotted line, in which the network device 220 first forwards the network flow to the DPI device 230. Upon receipt of the DPI result, the network device then forwards the network flow to destination device 240. Furthermore, the second flow rule can be configured such that the network flow is only forwarded to destination device 240 if the DPI result is positive/clean (e.g., where no malicious characteristics were identified during the deep packet inspection). If the DPI result is negative, the second flow table rule may cause the network device 220 to block the network flow or take some other or additional action. In other examples, the second behavior could be any of various types of actions. For example, the network flow could be sent through a logger, sent to a different destination, throttled, blocked, quarantined, tunneled to a service (e.g., firewall, load balancing, other security services), sent along a different network path (e.g, with higher or lower bandwidth, higher or lower utilization, or higher cost or lower cost), etc. Additionally, as described previously, SDN Controller 210 can program network device 220 to exhibit various levels or tiers of forwarding behaviors depending on the length of time that communication between the SDN Controller 210 and the network device 220 is interrupted.

Figure 3:
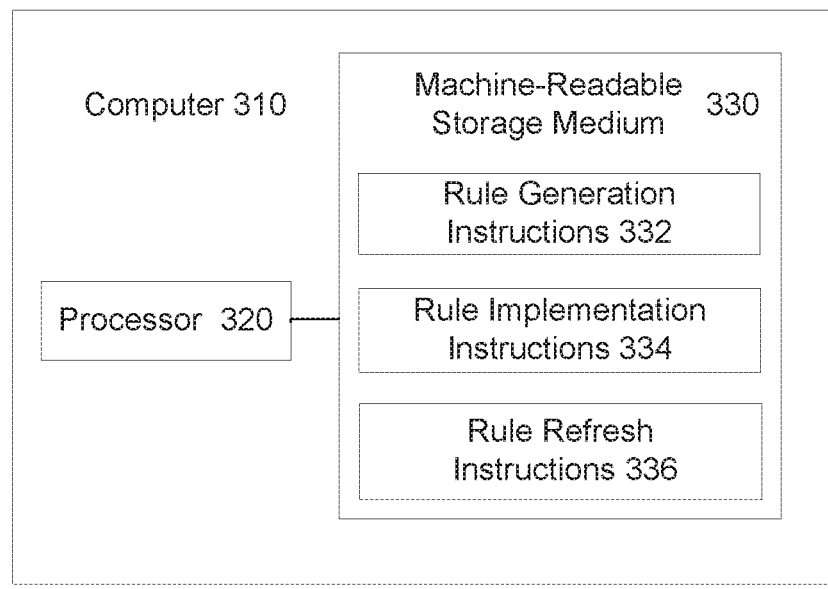
FIG. 3 illustrates a computer-readable medium to implement forwarding behavior based on communication activity between a controller and a network device, according to an example.

FIG. 3 illustrates a computer-readable medium to implement forwarding behavior based on communication activity between a controller and a network device, according to an example. Computer 310 may include and/or be implemented by one or more computers. For example, the computers may be server computers, workstation computers, desktop computers, laptops, mobile devices, or the like, and may be part of a distributed system. The computers may include one or more controllers and one or more machine-readable storage media, as described with respect to environment 200, for example.

Computer 310 may perform methods 100 and 120, and variations thereof. Additionally, the functionality implemented by computer 310 may be part of a larger software platform, system, application, or the like. For example, computer 310 may be part of an SDN network and may implement a network controller for the SDN network, such as SDN controller 210.

Processor 320 may be at least one central processing unit (CPU), at least one semiconductor-based microprocessor, other hardware devices or processing elements suitable to retrieve and execute instructions stored in machine-readable storage medium 330, or combinations thereof. Processor 320 can include single or multiple cores on a chip, multiple cores across multiple chips, multiple cores across multiple devices, or combinations thereof. Processor 320 may fetch, decode, and execute instructions 332-336 among others, to implement various processing. As an alternative or in addition to retrieving and executing instructions, processor 320 may include at least one integrated circuit (IC), other control logic, other electronic circuits, or combinations thereof that include a number of electronic components for performing the functionality of instructions 332-336. Accordingly, processor 320 may be implemented across multiple processing units and instructions 332-336 may be implemented by different processing units in different areas of computer 310.

Machine-readable storage medium 330 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium 330 can be computer-readable and non-transitory. Machine-readable storage medium 330 may be encoded with a series of executable instructions for managing processing elements.

The instructions 332-336 when executed by processor 320 (e.g., via one processing element or multiple processing elements of the processor) can cause processor 320 to perform processes, for example, methods 100 and 120, and/or variations and portions thereof.

For example, rule generation instructions 332 may cause processor 320 to generate, for a network device (e.g., network device 220), a first flow table rule to implement first forwarding behavior to be applied to a network flow in the event that communication to an SDN controller is active. Rule generation instructions 332 may also cause processor 320 to generate for the network device a second flow table rule to implement second forwarding behavior to be applied to the network flow in the event that communication to the SDN controller is inactive. Rule implementation instructions 334 may cause processor 320 to instruct the network device to implement the first and second flow table rules. Rule refresh instructions 336 may cause the processor 320 to periodically refresh the first flow table rule while communication between the network device and the SDN controller is active.

In the foregoing description, numerous details are set forth to provide an understanding of the subject matter disclosed herein. However, implementations may be practiced without some or all of these details. Other implementations may include modifications and variations from the details discussed above. It is intended that the appended claims cover such modifications and variations.

What is claimed is:

1. A method, comprising, by a processor of a Software Defined Network (SDN) controller:

generating, for a network device, a first flow table rule to implement first forwarding behavior for a network flow if communication to the SDN controller is active, the first flow table rule comprising match criteria for matching to the network flow, a first timeout value, and a first priority value;

generating, for the network device, a second flow table rule to implement second forwarding behavior for the network flow if communication to the SDN controller is not active, the second flow table rule comprising match criteria for matching to the network flow, a second timeout value, and a second priority value; and instructing the network device to implement the first and second flow table rules.

2. The method of claim 1, wherein the first timeout value is shorter than the second timeout value.

3. The method of claim 2, further comprising periodically refreshing the first flow table rule at an interval shorter than the first timeout value.

4. The method of claim 3, wherein the first priority value is higher than the second priority value, such that the first flow table rule takes precedence over the second flow table rule.

5. The method of claim 4, wherein if the first flow table rule is not refreshed before expiration of the first timeout value, the first flow table rule expires and the network device implements the second forwarding behavior for the network flow according to the second flow table rule.

6. The method of claim 5, wherein the SDN controller is unable to refresh the first flow table rule due to a disruption in communication between the SDN controller and the network device.

7. The method of claim 1, further comprising generating, for the network device, a third flow table rule to implement third forwarding behavior for the network flow if communication to the SDN controller is not active for an additional period of time, the flow table rule comprising match criteria for matching to the network flow, a third timeout value, and a third priority value, the third timeout value being longer than the first and second timeout values, and the third priority value being lower than the first and second priority values, such that the first and second flow table rules take precedence over the third flow table rule.

8. The method of claim 1, wherein the first flow table rule causes the network flow to be forwarded to a deep packet inspection service prior to being forwarded on to its destination and the second flow table rule causes the network flow to not be forwarded to the deep packet inspection service prior to being forwarded on to its destination.

9. The method of claim 1, further comprising determining the first and second timeout values based on a purpose of the first and second forwarding behavior.

10. A controller in a software defined network (SDN), comprising:

a policy module to determine first forwarding behavior for a network flow in the event that communication between a network device and the controller is active and second forwarding behavior for the network flow in the event communication between the network device and the controller is inactive;

a flow table rule module to generate a first flow table rule to implement the first forwarding behavior and a second flow table rule to implement the second forwarding behavior; and an instruction module to instruct the network device to implement the first and second flow table rules.

11. The controller of claim 10, wherein the first flow table rule comprises match criteria for matching to the network flow, a first timeout value, and a first priority value, and the second flow table rule comprises match criteria for matching to the network flow, a second timeout value longer than the first timeout value, and a second priority value lower than the first priority value.

12. The controller of claim 11, wherein the instruction module is to, at an interval shorter than the first timeout value, periodically instruct the network device to refresh the first flow table rule.

13. The controller of claim 10, wherein the policy module is to determine other forwarding behavior for other network flows in the event that communication between the network device is active or inactive, the flow table rule is to generate other flow table rules to implement the determined other forwarding behavior for the other network flows, and the instruction module to instruct the network device to implement the other flow table rules.

14. The controller of claim 10, wherein the policy module is to specify to the flow table rule module timeout values for the first and second forwarding behaviors based on a purpose of the first and second forwarding behaviors.

15. A non-transitory computer-readable storage medium storing instructions that, when executed by a processor of an SDN controller, cause the processor to:

generate, for a network device, a first flow table rule to implement first forwarding behavior to be applied to a network flow in the event that communication to the SDN controller is active;

generate, for the network device, a second flow table rule to implement second forwarding behavior to be applied to the network flow in the event that communication to the SDN controller is inactive;

instruct the network device to implement the first and second flow able rules; and periodically refresh the first flow table rule while communication between the network device and the SDN controller is active.

16. The storage medium of claim 15, wherein the second forwarding behavior includes tunneling the network flow to a network service.

17. The storage medium of claim 15, wherein the second forwarding behavior includes sending the network flow along a data link different from a data link used in the first forwarding behavior.

* * * * *